July 22, 1969    F. F. DE SMEDT ETAL    3,456,293
EXTRUSION APPARATUS
Filed March 17, 1967    2 Sheets-Sheet 1

United States Patent Office 3,456,293
Patented July 22, 1969

3,456,293
EXTRUSION APPARATUS
Felix Frederik De Smedt and Victor Alois Marinus, Wilrijk-Antwerp, Belgium, and Edwin August De Meyere, Porz, Germany, assignors to Gevaert-Agfa N.V., Mortsel, Belgium, a Belgian company
Filed Mar. 17, 1967, Ser. No. 623,899
Claims priority, application Great Britain, Mar. 17, 1966, 11,822/66
Int. Cl. B29f 3/00
U.S. Cl. 18—12                          3 Claims

ABSTRACT OF THE DISCLOSURE

A slit extrusion apparatus feeding the extruded film onto the surface of a cooling drum spaced from the slit and having at the ends of the slit edges, guides projecting lengthwise perpendicularly of the slit over at least a portion of the clearance between the slit and drum surface to maintain the film at full width by adherent contact of the guide inner surfaces with the film edges, the transverse dimension of the guide surfaces greatly exceeding the transverse dimension of the slit to accommodate variations in the path of the film in said clearance.

---

The present invention relates to an improved extrusion apparatus for the extrusion of thermoplastic flat film. The invention is particularly valuable in producing films composed of an orientable, crystallizable polyester.

In conventional extrusion apparatus the molten thermoplastic is forced through an elongate horizontal slit. The hot film thus made is carried around polished metal cooling rollers and is then stretched, e.g. in two directions perpendicular to each other, and heat-set, heat-relaxed, as desired.

During extrusion, it is important to be able to change the film thickness without interrupting the extrusion process.

A first known method comprises the changing of the width of the extrusion slit. Since the said method does not permit considerable changes in film thickness, and requires complicated adjustment means which, moreover, must be carefully set in order to avoid disuniformities in the thickness in the transverse direction, it is not preferred in practice.

According to another known technique, the ratio $v_r/v_e$ is changed, $v_r$ being the peripheral speed of the cooling rollers and $v_e$ being the extrusion speed. This may be done by changing the rate of the extruder and/or by changing the speed of the cooling and the other rollers of the apparatus. In case the ratio $v_r/v_e$ becomes greater than 1, the film tends to shrink transversely between the extrusion slit and the cooling roller.

Said transverse shrinking of the film is a function of the mentioned ratio $v_r/v_e$ and of the length of the gap between the extrusion slit and the cooling roller. As a direct consequence of the mentioned transverse shrinking the film thickness in the transverse direction, especially near the edges, will become non-uniform. This state of disuniformity is obviously undesirable in practice, if film of which the width as well as the thickness are constant within close predetermined limits is required.

By reducing the gap between the extrusion slit and the cooling roller the mentioned transverse shrinking for a ratio $v_r/v_e$ greater than 1 may be reduced, but this gives rise to another drawback, viz the film does not move downwardly in vertical direction to the cooling roller but is taken away obliquely so that its concave side runs along a lip of the extrusion die, whereby it is particularly liable to damage caused by small deficiencies at the said die lap.

The object of the invention is to provide an improved extrusion apparatus wherein the transverse shrinking of the film in the gap between the extrusion slit and the cooling roller is considerably reduced or is avoided.

A further object is to provide an improved apparatus wherein the gap between the extrusion slit and the cooling roller may be increased, without increasing the transverse shrinking. Thus the requirements as to the shape of the lips of the die which generally form a sharp V in order to minimize the gap from die to roller, and to the accessibility of the adjustment screws in the die for adjusting the width of the die, may be less stringent.

According to the present invention, an extrusion apparatus wherein a film of thermoplastic material is extruded through an elongate slit type die and is carried around a cooling roller, comprises a stationary film edge guide at each extremity of the extrusion slit which guide is in adherent contact with the film edge over part of the gap between the extrusion slit and the cooling roller.

Preferably each edge guide consists of a metal strip (which may be rectangular) which projects from each extremity of the extrusion slit substantially normal to the slit. In order to avoid excessive cooling of the film edges, the edge guides may be heated. They may further be made adjustable to a given extent so as sufficiently to adjust the film width.

The invention will be further described with reference to the accompanying drawings in which.

Figure 1:
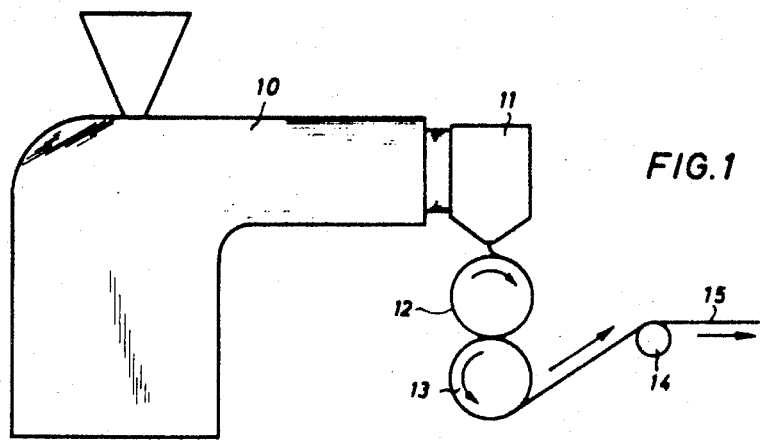
FIG. 1 is a diagrammatic view of an extrusion apparatus.

In FIG. 1 is shown an extruder 10 which is provided with a die 11. The thermoplastic film is extruded downwardly and carried around the driven cooling rollers 12, 13.

Over a free turning conveyer roller 14 the film 15 is passed to a further station which may be a wind-up station, a stretching zone, etc.

The peripheral speed $v_r$ of the cooling rollers 12, 13 is greater than the extrusion speed $v_e$ of the die 11.

Figure 2:
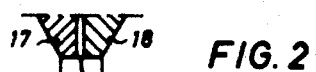
FIG. 2 is a cross-sectional view of the extremity of the die.

Owing to the tension of the film, the film follows a path in the gap between the die 11 and the cooling roller 12 as is enlargedly shown in part by the broken line 16 in FIG. 2. The transition of the rectilinear path of the film between the die lips 17 and 18 into the curved path 16 is discontinuous. Thereby the concave side of the film is liable to damage, since it strikes along the edges of the die lip 18, and defects in the surface structure of said lip, or sludge or stain, which in the course of extrusion may deposit at the front side of said lip, may cause stripes and other defects in the extruded film. Further, the longitudinal tensioning of the film causes shrinking of the film in the transverse direction.

Figure 3:
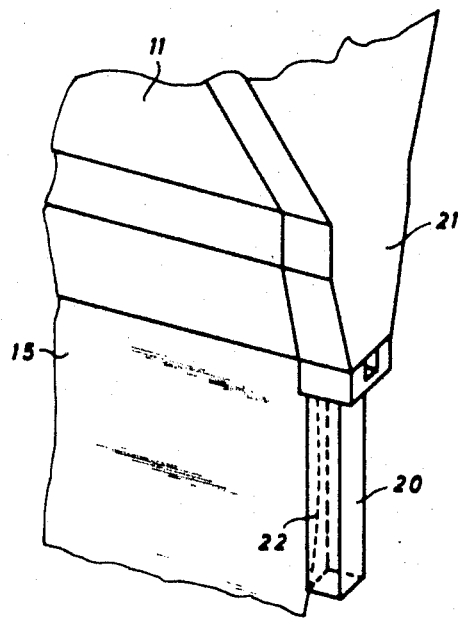
FIG. 3 is a perspective view of one extremity of a die, provided with a film edge guide according to the invention.

According to the invention film edge guides are provided at either extremity of the extrusion slit as shown diagrammatically in FIG. 2 by the rectangular strip 19 and perspectively by the member 20 in FIG. 3. The film edge guides consist of an elongate block of steel which is fitted to the end plates 21 at either side of the die 11. The faces of said edge guides facing each other project normal from the extremities of the extrusion slit. Hereinafter said faces are called the inner faces.

When the hot film leaves the extrusion slit, the edges of the film slide over the inner faces of the edge guides, and they are rather strongly prevented from withdrawal therefrom by the adherence which exists between the hot film edge and the metal surface. As a consequence thereof the film will follow a path, as shown by the broken line 22 in FIGS. 2 and 3, which first extends in the direction of the path between the lips 17, 18 and which thereafter deviates to a smaller degree than the path 16 until the film leaves the edge guides at or near their lower ends. The risk of damaging the concave side of the film is avoided or reduced thereby and the transverse shrinking of the film is reduced to zero.

The width and the length of the edge guides is chosen with regard to several parameters, e.g. the composition of the extruded film, the temperature of the film, the tensioning of the film, the kind of material of the edge guides, etc.

It is clear that for each case optimum conditions exist which cannot be exceeded unless the contact of the film with the edge guide is broken.

Some particular features which increase the efficiency of the film edge guides according to the invention are described in the following embodiment.

Figure 4:
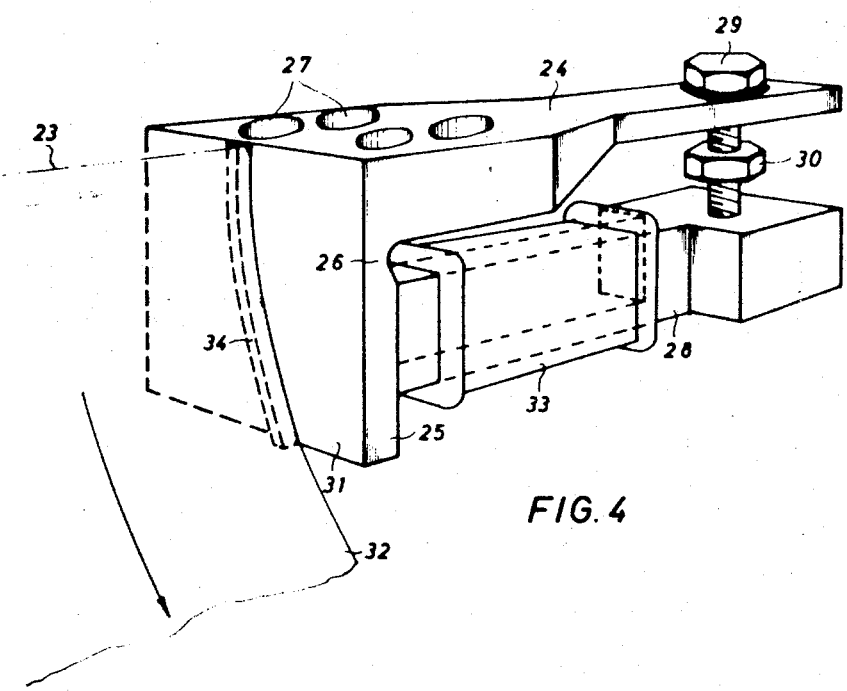
FIG. 4 is a perspective view of a film edge guide which is adjustable and can be heated.

In FIG. 4 is shown a film edge guide which is located at either extremity of a film extrusion slit which in the present figures is presented by the dash and dot line 23. The film edge guide which is L-shaped has a leg 24 and a leg 25. The leg 25 has a transverse region of locally weakened cross-section 26 whereby it is made adjustable in respect of the leg 24. The leg 24 is fitted to the die by means of bolts which pass through the bores 27. To the middle of the leg 25 is fitted an elongate leg 28 which extends in the same general direction as the leg 24. By means of a set-screw 29 which freely passes through a bore in the leg 24 and which threadedly engages a bore in the widened end of the leg 28, both legs may slightly be approached to each other so that the inner face 31 of the leg 25 which adherently engages the edge of the film 32 may take a position in respect of the corresponding inner face of the opposite edge guide, such that seen in the direction of travel of the film as figured by the arrow such inner faces are slightly diverging. Each edge guide or only one of them may be co-adjustable.

When the adjustment screw 29 is sufficiently unscrewed from the leg 28 so that the head of the screw is free of the leg 24, the distance between the legs 24 and 28 at the side of the screw may be slightly increased by turning the nut 30 anti-clockwise so that it pushes against the underside of the leg 24. In this way the face 31 may be made to converge with respect of the corresponding face of the opposite film edge guide.

The adjustable film edge guides just described provide an extremely simple and efficient means for finely adjusting the width of the extruded film.

In order to avoid excessive loss of heat at the film edges, especially when the edge guides are realtively long, the edge guides may be heated. In the embodiment shown in FIG. 4, the heating of the leg 25 occurs through the intermediary of the leg 28 around which an electrical heater element 33 is provided.

An arrangement which permits to still further control the path followed by the film when leaving the extrusion slit, is constituted by a projecting ledge 34 which is fitted to the inner face 31 of the edge guides. The ledge 34 first extends rectilinearily and then is slightly curved so as in use to adherently engage a marginal portion of the film at its convexly curved side.

It is clear that the effect of the mentioned ledge is limited, and the excessive tensioning of the film will break the adherent contact of the marginal film portion with the ledge.

The adherence between the film and the ledge may be equal to that between the film edge and the edge guide, but it may also be different therefrom. In the latter case, the required difference in adherence will be determinative for the choice of the material used for the inner face of the edge guide on the one hand and the projecting ledge on the other.

The invention is not limited to the described embodiments. The edge guide contacting the film edge may have other forms than the rectangular form shown. Thus both elonagte sides may be curved according to the intended general curvature of the film in the gap between the die and the cooling rollers, the edge guide may be tapered so as to extend more closely to the cooling roller, etc. Occasionally the distance between the inner faces of the edge guides may be slightly smaller than the width of the film, and a curved groove may be provided in the inner faces of each guide for receiving a marginal portion of the film as it leaves the extrusion slit, etc.

What we claim is:

1. In an extrusion apparatus wherein a film of thermoplastic material is extruded through an elongated slit type die and is carried around at least one cooling roller spaced from the slit, the improvement comprising a stationary film edge guide at each of the extremities of the extrusion slit, said edge guides extending substantially perpendicularly to said slit over at least a portion of the clearance between said slit and the cooler roller and being adapted to maintain adherent contact at their mutually facing surfaces with the edges of film being extruded from said slit, the transverse dimension of said facing surfaces being greatly in excess of the transverse dimension of said slit.

2. Apparatus according to claim 1, wherein said film edge guides are heated to a temperature comprised between the melting temperature of the thermoplastic material and the temperature of the cooling roller.

3. Apparatus according to claim 1, wherein one or each of said film edge guides is adjustable so that the guides can be set to diverge or converge slightly in the direction of travel of the film.

References Cited

UNITED STATES PATENTS

| | | |
|---|---|---|
| 2,479,804 | 8/1949 | Bailey et al. |
| 2,754,544 | 7/1956 | Bicher. |
| 2,998,624 | 9/1961 | Rickatts. |
| 3,072,962 | 1/1963 | McDermott et al. |
| 3,119,150 | 1/1964 | Hangerford. |
| 3,217,358 | 11/1965 | Kihara. |
| 2,364,435 | 12/1944 | Foster et al. |

WILLIAM J. STEPHENSON, Primary Examiner

U.S. Cl. X.R.

18—15